United States Patent
Coleman et al.

(10) Patent No.: US 6,484,500 B1
(45) Date of Patent: Nov. 26, 2002

(54) TWO TURBOCHARGER ENGINE EMISSION CONTROL SYSTEM

(75) Inventors: Gerald N. Coleman, Peoria, IL (US); Dennis D. Feucht, Morton, IL (US); James J. Faletti, Spring Valley, IL (US); David A. Pierpont, Peoria, IL (US)

(73) Assignee: Caterpillar, Inc, Peoria, IL (US)

(*) Notice: Subject to any disclaimer, the term of this patent is extended or adjusted under 35 U.S.C. 154(b) by 0 days.

(21) Appl. No.: 09/939,968

(22) Filed: Aug. 27, 2001

(51) Int. Cl.$^7$ ................................................. F02B 33/44
(52) U.S. Cl. .................... 60/612; 60/605.2; 123/568.11; 123/568.12
(58) Field of Search ............................... 60/612, 605.2; 123/568.11, 568.12

(56) References Cited

U.S. PATENT DOCUMENTS

| | | | |
|---|---|---|---|
| 6,202,414 B1 | * | 3/2001 | Schmidt et al. ................ 60/612 |
| 6,205,785 B1 | * | 3/2001 | Coleman .................... 60/605.2 |
| 6,263,673 B1 | * | 7/2001 | Schmidt et al. ................ 60/612 |
| 6,321,537 B1 | * | 11/2001 | Coleman et al. .............. 60/612 |
| 6,351,946 B1 | * | 3/2002 | Faletti .......................... 60/612 |
| 6,360,732 B1 | * | 3/2002 | Bailey et al. .................. 60/612 |
| 6,378,308 B1 | * | 4/2002 | Pfluger ......................... 60/612 |
| 6,397,598 B1 | * | 6/2002 | Pierpont ....................... 60/612 |
| 6,408,833 B1 | * | 6/2002 | Faletti ........................ 60/605.2 |

* cited by examiner

*Primary Examiner*—Thomas Denion
*Assistant Examiner*—Thai-Ba Trieu (57) ABSTRACT

An internal combustion engine comprises a first exhaust manifold, a second exhaust manifold, a first turbocharger having a first turbine and a first compressor, and a second turbocharger having a second turbine and a second compressor. A second gas inlet port of the second turbine is connected in fluid communication with a second exhaust manifold to receive at least a portion of second combustion gases. A second gas outlet port of the second turbine and the first exhaust manifold are in fluid communication with a first gas inlet port of the first turbine. A valve is connected in fluid communication with the second exhaust manifold to receive a remainder of exhaust gases not included in the at least a portion of the second combustion gases supplied to the second turbine. The valve is connected in fluid communication with a mixer to deliver at least a portion of the remainder of exhaust gases to the mixer for mixing with compressed air in the mixer.

20 Claims, 4 Drawing Sheets

TWO TURBOCHARGER ENGINE EMISSION CONTROL SYSTEM

TECHNICAL FIELD

This invention relates generally to an internal combustion engine and, more particularly, to a two turbocharger engine emission control system for an internal combustion engine.

BACKGROUND ART

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily recirculate the exhaust gas by-products into the intake air supply of the internal combustion engine. The exhaust gas which is introduced to the engine cylinder reduces the concentration of oxygen therein, which is turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the internal combustion engine.

In many EGR applications, the exhaust gas is diverted by a poppet-type EGR valve directly from the exhaust manifold. The percentage of the total exhaust flow which is diverted for reintroduction into the intake manifold of an internal combustion engine is known as the EGR flow rate of the engine.

Some internal combustion engines include turbochargers to increase engine performance, and are available in a variety of configurations. For example, fixed housing turbochargers have a fixed exhaust inlet nozzle which accelerates exhaust gas towards a turbine wheel, which in turn rotates a compressor. Also, a variable nozzle turbocharger (VNT) has a variable nozzle having a ring of a plurality of variable vanes which are controlled to change the cross sectional area through which the exhaust gases pass to reach the turbine. In a VNT, the smaller the nozzle opening, the faster the gas velocity to the turbine, and in turn, the higher the boost. Still further, it is known to provide a turbocharger having two independent compressors, which is known as a double sided compressor. Use of a single turbocharger of the types described above, however, constrain the operation and configuration of an EGR system for use with an internal combustion engine.

When utilizing EGR in a turbocharged diesel engine, the exhaust gas to be recirculated is often removed upstream of the exhaust gas driven turbine associated with the turbocharger. The recirculated exhaust gas is typically introduced to the intake air stream downstream of the compressor and air-to-air after-cooler (ATAAC). Reintroducing the exhaust gas downstream of the compressor and ATAAC is preferred in some systems due to the reliability and maintainability concerns that arise if the exhaust gas passes through the compressor and ATAAC.

In other systems, such as a system having a double sided turbocharger, a gas flow from an EGR valve may be directed to a secondary compressor inlet of the turbocharger. A separate EGR cooler is provided upstream of a secondary compressor inlet to cool the EGR gas prior to being received by the secondary compressor. In addition, a bypass circuit may be provided around the EGR cooler to adjust the amount of cooling of the EGR gas by the EGR cooler. Such a system, however, is subject to the negative effects of condensation and associated corrosion.

The present invention is directed to overcoming one or more of the problems or disadvantages associated with the prior art.

DISCLOSURE OF THE INVENTION

In one aspect of the invention, an internal combustion engine is provided comprising a block defining a plurality of combustion cylinders, the plurality of combustion cylinders having at least a first group of combustion cylinders and a second group of combustion cylinders. A first exhaust manifold is connected to the first group of combustion cylinders to receive first combustion gases from the first group of combustion cylinders. A second exhaust manifold is connected to the second group of combustion cylinders to receive second combustion gases from the second group of combustion cylinders. A first turbocharger is provided having a first turbine and a first compressor, the first turbine having a first gas inlet port and a first gas outlet port, the first compressor having a first air inlet port and a first air outlet port, the first gas inlet port being connected in fluid communication with the first exhaust manifold, and the first air inlet port of the first compressor being in fluid communication with the atmosphere. A second turbocharger is provided having a second turbine and a second compressor, the second turbine having a second gas inlet port and a second gas outlet port, the second compressor having a second air inlet port and a second air outlet port, the second gas inlet port being connected in fluid communication with the second exhaust manifold to receive at least a portion of the second combustion gases, the second gas outlet port being connected in fluid communication with the first gas inlet port of the first turbine, and the second air inlet port of the second compressor being in fluid communication with the first air outlet port of the first compressor. A mixer is provided having a first input port, a second input port and an output port, the first input port being coupled to the second air outlet port to receive compressed air from the second turbocharger, and the output port being in fluid communication with the plurality of combustion cylinders. A valve is connected in fluid communication with the second exhaust manifold to receive a remainder of exhaust gases not included in the at least a portion of the combustion exhaust gases received by the second turbine, the valve being connected in fluid communication with the second input port of the mixer to deliver at least a portion of the remainder of exhaust gases to the mixer for mixing with the compressed air in the mixer.

In another aspect of the invention, a method of providing engine emission control for an internal combustion engine is provided, comprising the steps of: providing a first turbocharger having a first turbine and a first compressor, the first turbine having a first gas inlet port and a first gas outlet port, the first compressor having a first air inlet port and a first air outlet port; providing a second turbocharger having a second turbine and a second compressor, the second turbine having a second gas inlet port and a second gas outlet port, the second compressor having a second air inlet port and a second air outlet port; supplying first combustion gases from a first group of combustion cylinders to a first exhaust manifold; supplying second combustion gases from a second group of combustion cylinders to a second exhaust manifold; supplying the first combustion gases from the first exhaust manifold to the first gas inlet port of the first turbine; supplying at least a portion of the second combustion gases from the second manifold to the second gas inlet port of the second turbine; supplying exhaust gases expelled from the second gas outlet port of the second turbine to the first gas inlet port of the first turbine; supplying fresh air to the first air inlet port of the first compressor from the atmosphere; compressing the fresh air by the first compressor to form first stage compressed air; supplying the first stage compressed air from the first compressor to the second air inlet port of the second compressor; compressing the first stage compressed air with the second compressor to form second stage compressed air; supplying the second stage compressed air to a mixer; and supplying to the mixer at least a portion of a reminder of exhaust gases not included in the at least a portion of the second combustion gases supplied to the second turbine, for mixing with the second stage compressed air to form a mixture.

BEST MODE FOR CARRYING OUT THE INVENTION

Referring the drawings, there is shown in FIGS. 1–4 several embodiments of the present invention. Corresponding reference characters indicate corresponding parts throughout the several figures.

Figure 1:
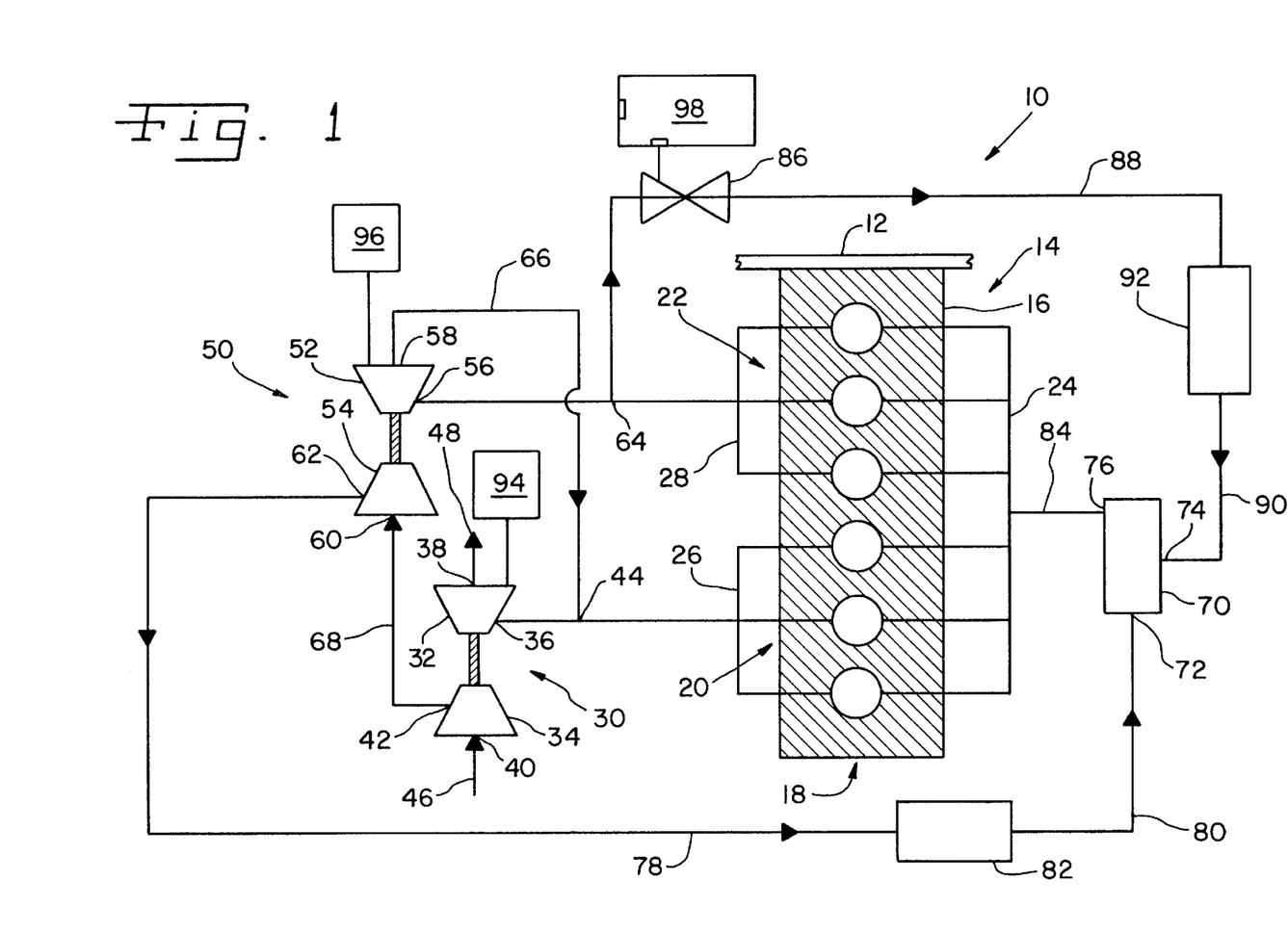
FIG. 1 is a graphical illustration of a first embodiment of a two turbocharger engine emission control system of the present invention.

Referring now to FIG. 1, there is shown a work machine 10 having frame 12 to which an internal combustion engine 14 is attached.

Internal combustion engine 14 has a block 16 that defines a plurality of combustion cylinders 18. The plurality of combustion cylinders 18 is segregated into at least two groups, a first group of combustion cylinders 20 and a second group of combustion cylinders 22. As shown in FIGS. 1–4, each of the groups of combustion cylinders 20, 22 includes three combustion cylinders, although it is to be recognized that each of the groups of combustion cylinders 20, 22 could have as few as one combustion cylinder.

An intake manifold 24 is connected to block 16 for providing combustion air to each of the plurality of combustion cylinders 18.

A first exhaust manifold 26 is connected in fluid communication with the first group of combustion cylinders 20 to receive first combustion gases from the first group of combustion cylinders 20. A second exhaust manifold 28 is connected in fluid communication with the second group of combustion cylinders 22 to receive second combustion gases from the second group of combustion cylinders 22.

Each of the arrangements of FIGS. 1–4 has two turbochargers: a first turbocharger 30 and a second turbocharger 50. First turbocharger 30 represents a first (low pressure) stage of the invention, while second turbocharger 50 represents a second (high pressure) stage of the invention.

Referring again to FIG. 1, first turbocharger 30 has a first turbine 32 and a first compressor 34. First turbine 32 has a first gas inlet port 36 and a first gas outlet port 38. First compressor 34 has a first air inlet port 40 and a first air outlet port 42. First gas inlet port 36 is connected in fluid communication with first exhaust manifold 26 via a Y-conduit 44. First air inlet port 40 of first compressor 34 is in fluid communication with the atmosphere for receiving fresh air, either directly or through an upstream air cleaner, depicted by arrow 46, for combustion. First gas outlet port 38 is also in communication with the atmosphere for expelling exhaust gases, either directly or through a downstream muffler or converter system, as depicted by arrow 48.

Second turbocharger 50 has a second turbine 52 and a second compressor 54. Second turbine 52 has a second gas inlet port 56 and a second gas outlet port 58. Second compressor 54 has a second air inlet port 60 and a second air outlet port 62. Second gas inlet port 56 is connected in fluid communication with second exhaust manifold 28 via a Y-conduit 64 to receive at least a portion of the second combustion gases from the second group of combustion cylinders 22. Second gas outlet port 58 is connected via conduit 66 and Y-conduit 44 to be in fluid communication with first gas inlet port 36 of first turbine 32. Second air inlet port 60 of second compressor 54 is connected via conduit 68 in fluid communication with first air outlet port 42 of first compressor 34 to receive first stage compressed air therefrom.

A mixer 70 mixes compressed air and recirculated exhaust gases prior to their introduction into intake manifold 24. Mixer 70 has a first input port 72, a second input port 74 and an output port 76. First input port 72 is coupled via conduits 78, 80 and after-cooler 82 to second air outlet port 62 of second compressor 54 to receive second stage compressed air from second turbocharger 50. Output port 76 is connected in fluid communication with intake manifold 24 via a conduit 84.

A valve 86 is connected in fluid communication with second exhaust manifold 28 via Y-conduit 64 to controllably receive a remainder of exhaust gases not included in the at least a portion of the second combustion gases supplied to second turbine 52 from the second group of combustion cylinders 22. Valve 86 is connected in fluid communication via conduits 88, 90 and an EGR cooler 92 with second input port 74 of mixer 70 to deliver the remainder of exhaust gases to mixer 70 for mixing with the second stage compressed air in mixer 70.

In the embodiment of FIG. 1, each of turbochargers 30 and 50 is a VNT turbocharger. A controller 94 is connected to turbocharger 30 to control the nozzle opening to turbine 32. A controller 96 is connected to turbocharger 50 to control the nozzle opening to turbine 52. A controller 98 is connected to valve 86 to control the actuation thereof.

It is to be recognized that the controllers 94, 96 and 98 are shown individually for convenience. However, it is contemplated that the functions of controllers 94, 96 and 98 could be combined into one or two controllers, as desired.

Figure 2:
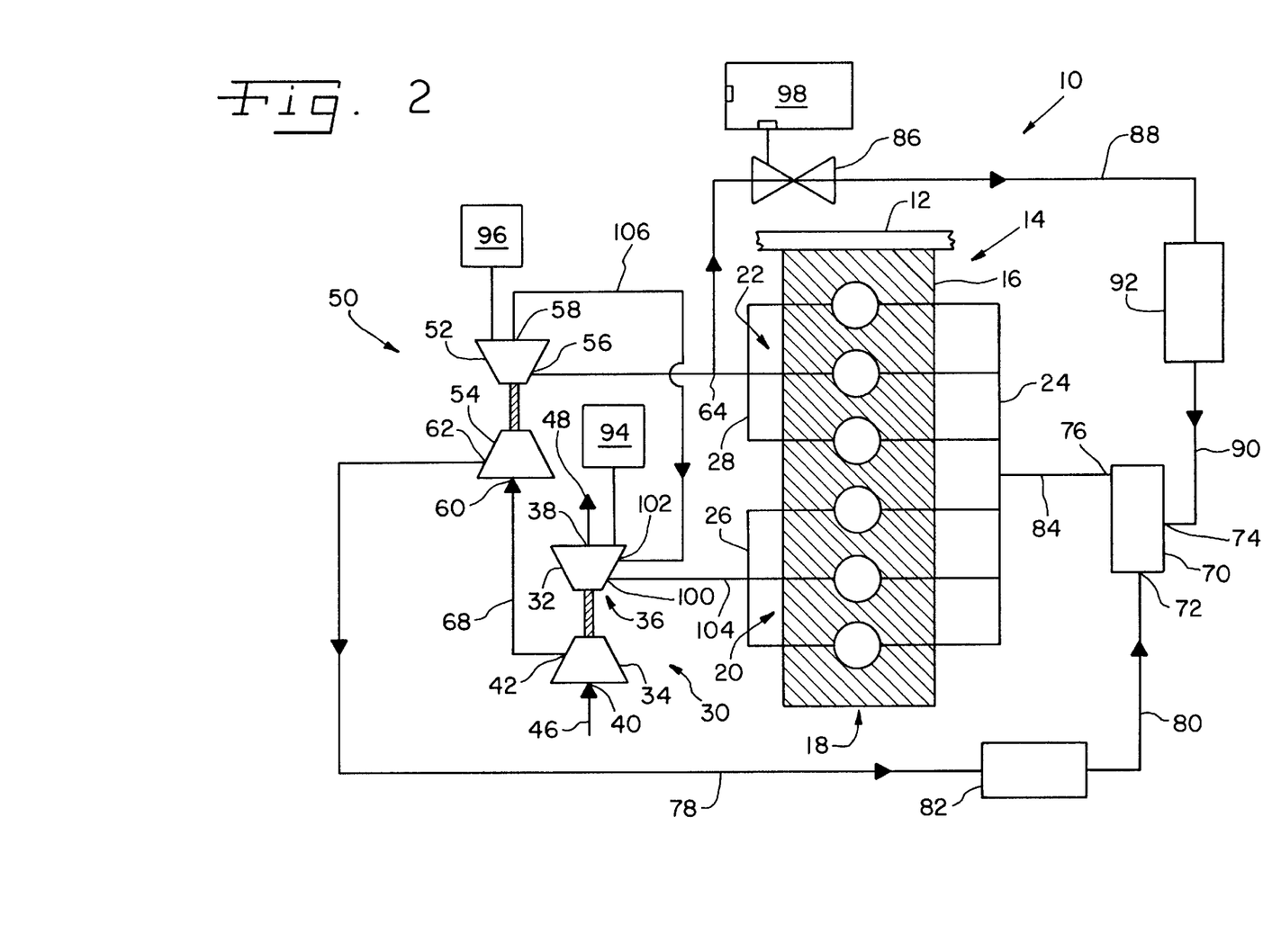
FIG. 2 is a graphical illustration of another embodiment of a two turbocharger engine emission control system of the present invention.

The embodiment of FIG. 2 shares similarities with that of the embodiment of FIG. 1. To avoid unnecessary repetition, the discussion that follows focuses primarily on points of difference between the systems of FIGS. 1 and 2.

As shown in FIG. 2, first gas inlet port 36 of first turbocharger 30 is formed by two separate gas input ports 100, 102. First gas input port 100 is connected in fluid communication with first exhaust manifold 26 via a conduit 104, and second gas input port 102 is connected in fluid communication with second gas outlet port 58 of second turbocharger 50 via a conduit 106.

In the embodiment of FIG. 2, turbocharger 30 is a waste-gated turbocharger and turbocharger 50 is a VNT turbocharger. Controller 94 is connected to turbocharger 30 to control the waste gate of turbocharger 30. Controller 96 is connected to turbocharger 50 to control the nozzle opening to turbine 52. Again, controller 98 is connected to valve 86 to control the actuation thereof.

Figure 3:
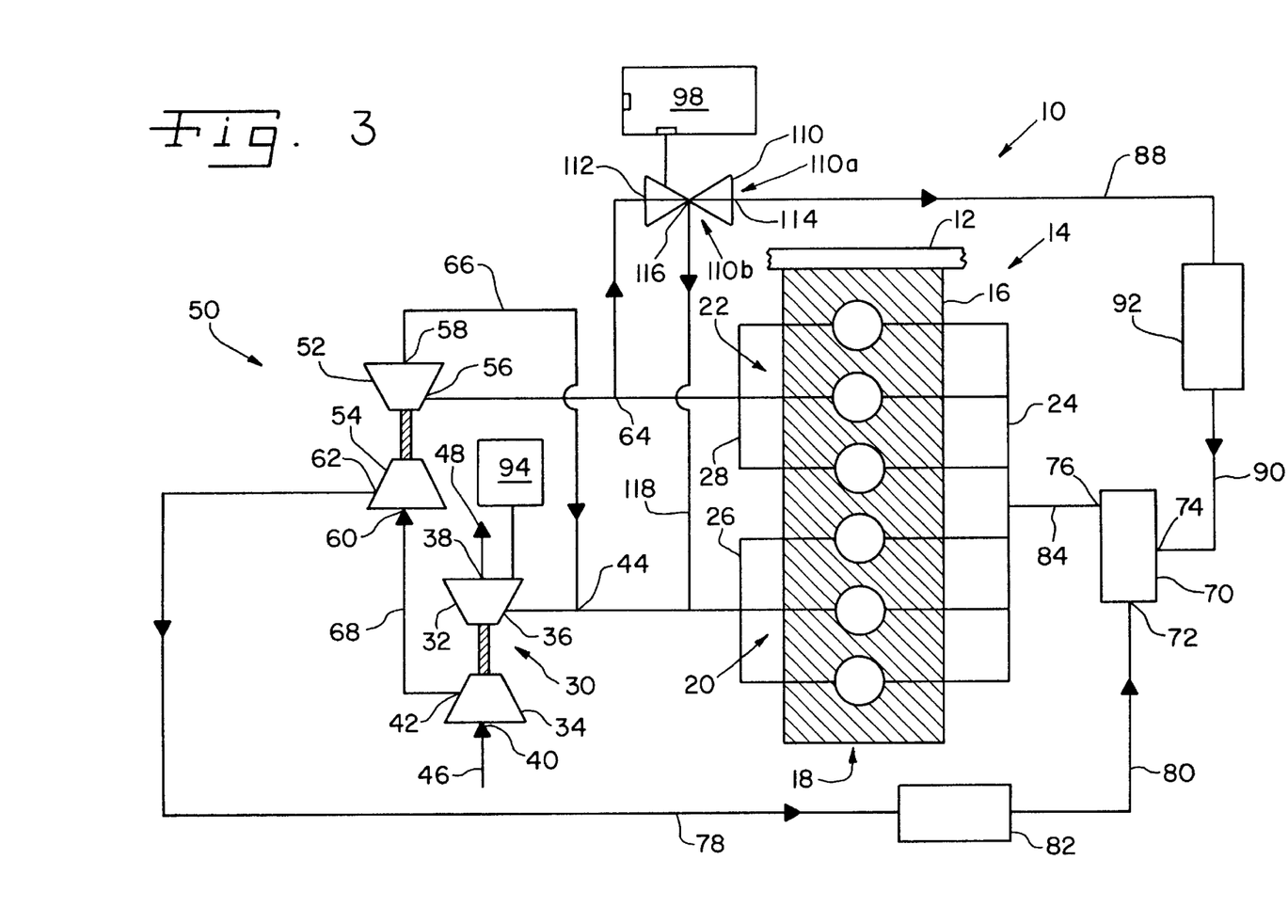
FIG. 3 is a graphical illustration of another embodiment of a two turbocharger engine emission control system of the present invention.

The embodiment of FIG. 3 shares some similarities with the embodiments of FIGS. 1 and 2. Again, to avoid unnecessary repetition, the discussion that follows focuses primarily on the points of difference between the arrangement of FIG. 3 and the arrangements of FIGS. 1 and 2.

In FIG. 3, the valve 86 of FIGS. 1 and 2 is replaced by a valve 110. Valve 110 is a combination of two valves, an EGR valve 110a and a waste gate valve 110b, and has an exhaust inlet port 112, an EGR port 114 and a waste gate port 116. Exhaust inlet port 112 is connected to Y-conduit 64. Y-conduit 64 is also connected to second exhaust manifold 28 and to second gas inlet port 56 of second turbine 52. EGR port 114 of EGR valve 110a is connected in fluid communication with mixer 70 via conduits 88, 90 and EGR cooler 92. Waste gate port 116 of waste gate valve lob is connected in fluid communication with first gas inlet port 36 of first turbocharger 30 via a conduit 118 and Y-conduit 44. Conduit 118 ties into Y-conduit 44 downstream of first exhaust manifold 26 and upstream of the exhaust flow delivered by second gas outlet port 58 of second turbine 52 of second turbocharger 50. Alternatively, conduit 118 could be tied in upstream of first exhaust manifold 26.

In one form of the embodiment of FIG. 3, turbocharger 30 is a fixed housing waste-gated turbocharger and turbocharger 50 is a fixed housing turbocharger. Controller 94 is connected to turbocharger 30 to control the waste gate of turbocharger 30. The controller 96 depicted in each of FIGS. 1 and 2 has been eliminated since turbocharger 50 has fixed operating characteristics. Controller 98 is connected to valve 110 to control the operation of both EGR valve 110a and waste gate valve 110b of valve 110.

In another form of the embodiment of FIG. 3, turbocharger 30 is a VNT turbocharger and turbocharger 50 is a fixed housing turbocharger. Controller 94 is connected to turbocharger 30 to control the nozzle opening to turbine 32 of turbocharger 30. Again, the controller 96 depicted in each of FIGS. 1 and 2 has been eliminated since turbocharger 50 has fixed operating characteristics. Also, again, controller 98 is connected to valve 110 to control the operation of both EGR valve 11a and waste gate valve 110b of valve 110.

Figure 4:
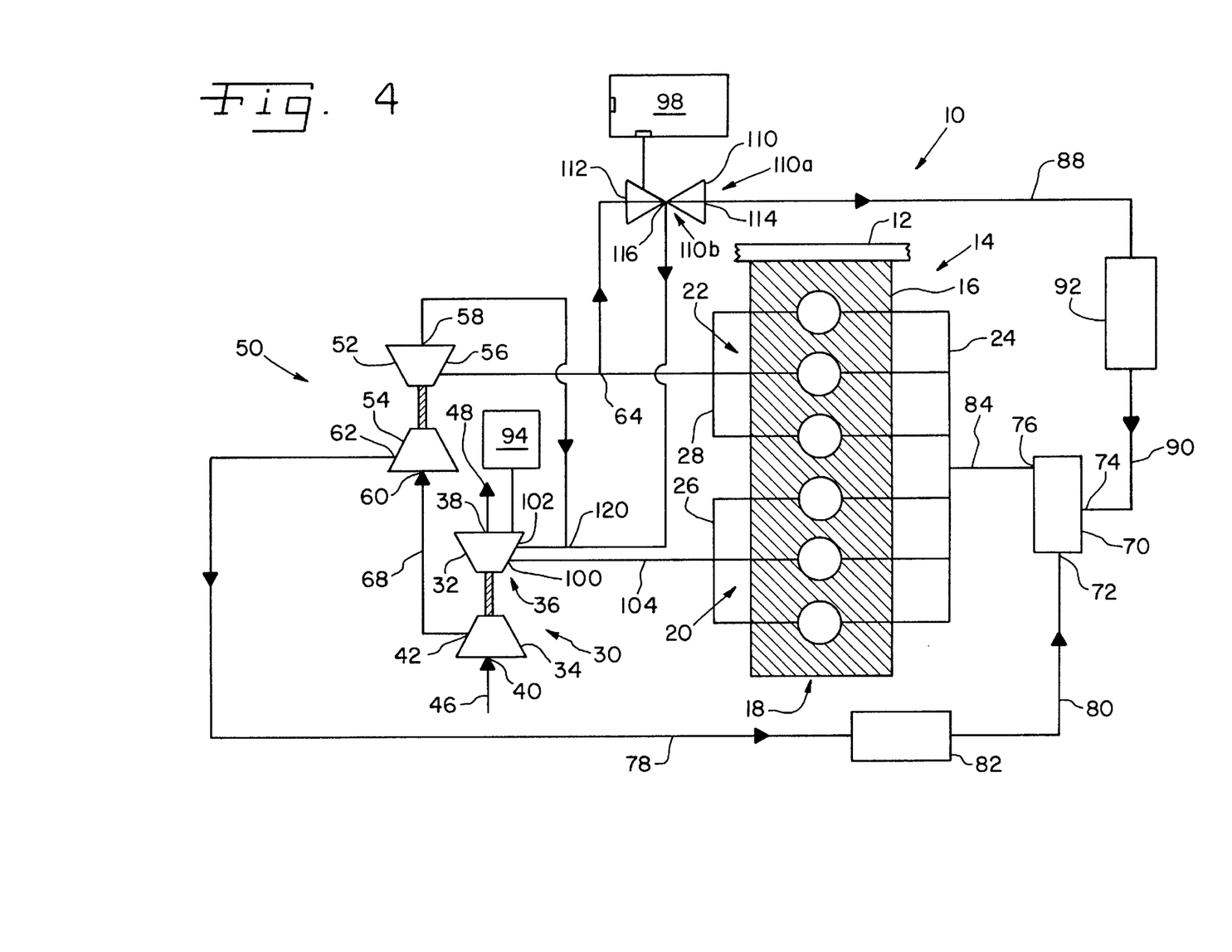
FIG. 4 is a graphical illustration of another embodiment of a two turbocharger engine emission control system of the present invention.

The embodiment depicted in FIG. 4 combines the dual port aspects of first gas inlet port 36 of turbine 32 of turbocharger 30, as described above with respect to FIG. 2, with the combination valve 110 described above with respect to FIG. 3.

As shown in FIG. 4, first gas inlet port 36 of first turbocharger 30 is formed by two separate gas input ports 100, 102. First gas input port 100 is connected in fluid communication with first exhaust manifold 26 via conduit 104. Second gas input port 102 is connected in fluid communication with both second gas outlet port 58 of second turbocharger 50 and waste gate port 116 of waste gate valve 110b via a Y-conduit 120.

In the embodiment of FIG. 4, turbocharger 30 is a fixed housing waste-gated turbocharger and turbocharger 50 is a fixed housing turbocharger. Controller 94 is connected to turbocharger 30 to control the waste gate of turbocharger 30. Again, the controller 96 depicted in each of FIGS. 1 and 2 has been eliminated since turbocharger 50 has fixed operating characteristics. Also, again, controller 98 is connected to valve 110 to control the operation of both EGR valve 110a and waste gate valve 110b of valve 110.

Industrial Applicability

During operation, with reference to the embodiments of FIGS. 1 and 2, first combustion gases from the first group of combustion cylinders 20 is supplied to first gas inlet port 36 of turbine 32 which causes turbine 32 to rotate, which in turn causes first compressor 34 to rotate. The exhaust gases 48 that pass through first turbocharger 30 are expelled into the atmosphere via first gas outlet port 38. The rotation of compressor 34 results in fresh air being drawn into first air inlet port 40 of first compressor 34. The fresh air compressed by first turbocharger 30 is delivered to second air inlet port 60 of second turbocharger 50.

Second turbocharger 50 receives at least a portion of the second combustion gases from the second group of combustion cylinders 22, which causes second turbine 52 to rotate, which in turn causes second compressor 54 to rotate. In the embodiment of FIG. 1, the exhaust gases that exit second gas outlet port 58 are combined with the exhaust gases expelled from first exhaust manifold 26, and this combination of gases is supplied to first gas inlet port 36 of first turbine 32. In the embodiment of FIG. 2, the exhaust gases that exit second gas outlet port 58 are supplied to the second gas input port 102 of gas inlet port 36, and the first combustion gases expelled from first exhaust manifold 26 are supplied to first input port 100 of gas inlet port 36.

Second compressor 54 further compresses the first stage compressed air supplied thereto by first compressor 34, and the second stage compressed air is supplied via after-cooler 82 to mixer 70. After-cooler 82 cools the second stage compressed air prior to delivery to mixer 70.

Valve 86 receives a remainder of exhaust gases not included in the at least a portion of the second combustion gases supplied to second turbine 52 from the second group of combustion cylinders 22. Valve 86 delivers the remainder of exhaust gases (i.e., exhaust gases not supplied to second turbine 52) via EGR cooler 92 to mixer 70 for mixing with the second stage compressed air in mixer 70. EGR cooler 92 cools the exhaust gases prior to delivery to mixer 70.

A fresh air/exhaust gas mixture exits mixer 70 and is supplied to intake manifold 24, which in turn directs the fresh air/exhaust gas combination to the plurality of combustion cylinders 18.

In the embodiment of FIG. 1, each of turbochargers 30 and 50 is a VNT turbocharger. Controller 94 is programmed to control the size of the nozzle opening to turbine 32, which in turn controls the revolution velocity of turbine 32 and compressor 34. Controller 96 is programmed to control the size of the nozzle opening to turbine 52, which in turn controls the revolution velocity of turbine 52 and compressor 54. Controller 98 controls the actuation of valve 86 to thereby regulate the amount of exhaust gases from second exhaust manifold 28 which will be diverted to mixer 70 for combination with the second stage compressed air delivered by turbocharger 50.

In the embodiment of FIG. 2, turbocharger 30 is a waste-gated turbocharger and turbocharger 50 is a VNT turbocharger. Also, turbocharger 30 has a divided turbine housing that includes two separate gas input ports 100, 102, thereby facilitating the receipt of exhaust gases from first exhaust manifold 26 and from second turbine 52 through separate ports.

Controller 94 is programmed to control the operation of the waste gate associated with turbine 32 to controllably release a portion of the received exhaust gases to the atmosphere, which in turn controls the revolution velocity of turbine 32 and compressor 34. Controller 96 is programmed to control the size of the nozzle opening to turbine 52, which in turn controls the revolution velocity of turbine 52 and compressor 54. Controller 98 controls the actuation of valve 86 to thereby regulate the amount of exhaust gases from second exhaust manifold 28 which will be diverted to mixer 70 for combination with the second stage compressed air delivered by turbocharger 50.

Controllers 94, 96 and 98 may be individual controllers that cooperate to provide the desired EGR flow rate to internal combustion engine 14. Also, it is contemplated that the control functions of two or more of the controllers 94, 96 and 98 may be combined into a single controller. It is further contemplated that each of controllers 94, 96 and 98 may be either mechanical, electrical or a combination thereof. The electrical controllers may include a microprocessor and associated memory for executing control programs to provide the desired control function.

During operation, with reference to the embodiments FIGS. 3 and 4, first combustion gases from the first group of combustion cylinders 20 is supplied to first gas inlet port 36 of turbine 32 which causes turbine 32 to rotate, which in turn causes first compressor 34 to rotate. The exhaust gases 48 that pass through first turbocharger 30 are expelled into the atmosphere via first gas outlet port 38. The rotation of compressor 34 results in fresh air being drawn into first air inlet port 40 of first compressor 34. The fresh air compressed by first turbocharger 30 is delivered to second air inlet port 60 of second turbocharger 50.

Second turbocharger 50 receives at least a portion of the second combustion gases from the second group of combustion cylinders 22, which causes second turbine 52 to rotate, which in turn causes second compressor 54 to rotate. In FIG. 3, the exhaust gases that exit second gas outlet port 58 are combined with the exhaust gases expelled from first exhaust manifold 26, and this combination is supplied to first gas inlet port 36 of first turbine 32. In the embodiment of FIG. 4, the exhaust gases that exit second gas outlet port 58 are supplied to the second gas input port 102 of gas inlet port 36, and the first combustion gases expelled from first exhaust manifold 26 are supplied to first input port 100 of gas inlet port 36. Second compressor 54 further compresses the first stage compressed air supplied thereto by first compressor 34, and the second stage compressed air is supplied via after-cooler 82 to mixer 70. After-cooler 82 cools the second stage compressed air prior to delivery to mixer 70.

Valve 110 receives a remainder of exhaust gases not included in the at least a portion of the second combustion gases supplied to second turbine 52 from the second group of combustion cylinders 22. Valve 110 is a combination valve that serves as an EGR valve 110a and a waste gate valve 110b, which preferably, are controlled through a single actuator. Valve 110 controllably delivers via EGR port 114a first portion of the remainder of exhaust gases via EGR cooler 92 to mixer 70. Also, valve 110 delivers via waste gate port 116 a second portion of the remainder of exhaust gases for combination with the exhaust gases expelled by first exhaust manifold 26, which in turn is used to drive first turbine 32 of first turbocharger 30, along with the first combustion gases expelled by first exhaust manifold 26. EGR cooler 92 cools the exhaust gases prior to delivery to mixer 70.

The internal profile and passage diameters within valve 110 are sized as appropriate to achieve balanced flows for engine operating conditions experienced by internal combustion engine 14.

A fresh air/exhaust gas combination exits mixer 70 and is supplied to intake manifold 24, which in turn directs the fresh air/exhaust gas combination to the plurality of combustion cylinders 18.

In one form of the embodiment of FIG. 3, turbocharger 30 is a fixed housing waste-gated turbocharger and turbocharger 50 is a fixed housing turbocharger. Controller 94 is programmed to control the operation of the waste gate associated with turbine 32 to controllably release a portion of the received exhaust gases to the atmosphere, which in turn controls the revolution velocity of turbine 32 and compressor 34. Controller 98 is programmed to control the operation of both EGR valve 110a and waste gate valve 100b of valve 110 to thereby regulate the division of the remainder of exhaust gases from second exhaust manifold 28 not supplied to second turbine 52 into two portions. The first portion is diverted to mixer 70 for combination with the second stage compressed air delivered by turbocharger 50. The second portion is diverted to be combined with the exhaust gases expelled by first exhaust manifold 26 and the exhaust gases expelled by second turbine 52, and the combination is supplied to first turbine 32.

In another form of the embodiment of FIG. 3, turbocharger 30 is a VNT turbocharger and turbocharger 50 is a fixed housing turbocharger. Controller 94 is programmed to control the size of the nozzle opening to turbine 32, which in turn controls the revolution velocity of turbine 32 and compressor 34. Controller 98 is programmed to control the operation of both EGR valve 110a and waste gate valve 110b of valve 110 to thereby regulate the division of the remainder of exhaust gases from second exhaust manifold 28 not supplied to second turbine 52 into two portions. The first portion is diverted to mixer 70 for combination with the second stage compressed air from turbocharger 50. The second portion is diverted to be combined with the exhaust gases expelled by first exhaust manifold 26 and the exhaust gases expelled by second turbine 52, and the combination is supplied to first turbine 32.

In the embodiment of FIG. 4, turbocharger 30 is a waste-gated turbocharger and turbocharger 50 is a fixed housing turbocharger. Also, turbocharger 30 has a divided turbine housing that includes two separate gas input ports 100, 102, thereby facilitating the receipt of exhaust gases from first exhaust manifold 26 through one port 100, and the receipt of the combined exhaust gases from second turbine 52 and waste gate valve 110b through the separate second port 102.

Controller 94 is programmed to control the operation of the waste gate associated with turbine 32 to controllably release a portion of the received exhaust gases to the atmosphere, which in turn controls the revolution velocity of turbine 32 and compressor 34. Controller 98 is programmed to control the operation of both EGR valve 110a and waste gate valve 110b of valve 110 to thereby regulate the division of the remainder of exhaust gases from second exhaust manifold 28 not supplied to second turbine 52 into two portions. The first portion is diverted to mixer 70 for combination with the second stage compressed air from turbocharger 50. The second portion is diverted to be combined with the exhaust gases expelled by second turbine 52, and the combination is supplied to first turbine 32.

Controllers 94 and 98 may be individual controllers that cooperate to provide the desired EGR flow rate to internal combustion engine 14. Also, it is contemplated that the control functions of controllers 94 and 98 may be combined into a single controller. It is further contemplated that each of controllers 94 and 98 may be either mechanical, electrical or a combination thereof. The electrical controllers may include a microprocessor and associated memory for executing control programs to provide the desired control function.

Presently, the embodiment of FIG. 1 appear to provide the best overall control of the operation of internal combustion engine 14. The embodiment of FIG. 1 provides excellent control of the EGR flow rate using the control of the second stage VNT turbocharger, and provides excellent engine load acceptance and engine braking using the controls of the first stage VNT turbocharger.

The embodiment of FIG. 2 provides the advantage of good fuel consumption and excellent control of the EGR flow rate with the controls of the second stage VNT turbocharger. In comparison to the embodiment of FIG. 1, however, it has some disadvantages when considering engine load acceptance and engine braking.

In the embodiments of FIGS. 1 and 2, valve 86 provides final control of the EGR flow rate.

The first form of the embodiment of FIG. 3 and the embodiment of FIG. 4 uses two fixed housing turbochargers, which is the lowest cost and may prove to be the most reliable. The first stage fixed housing turbocharger is waste-gated. The EGR flow rate is primarily determined by respective valves 110a and 110b.

In the second form of the embodiment of FIG. 3, the second stage fixed housing turbocharger sets a differential pressure between the two exhausts manifolds to a high enough pressure to force EGR flow, and the EGR valve controls the EGR flow rate to the mixer and intake manifold. The first stage VNT turbocharger is advantageous to engine load acceptance and engine braking.

In the embodiments of FIGS. 3 and 4, the integral EGR and waste gate valve 110 is used to reduce exhaust back pressure on cylinders feeding exhaust to the second stage turbocharger, and allows for some energy recovery in the first stage turbocharger, to reduce fuel consumption.

Other aspects and features of the present invention can be obtained from study of the drawings, the disclosure, and the appended claims.

What is claimed is:

1. An internal combustion engine, comprising:
   a block defining a plurality of combustion cylinders, said plurality of combustion cylinders having at least a first group of combustion cylinders and a second group of combustion cylinders;
   an intake manifold connected to said block for providing combustion air to each of the plurality of combustion cylinders;
   a first exhaust manifold connected to said first group of combustion cylinders to receive first combustion gases from said first group of combustion cylinders;
   a second exhaust manifold connected to said second group of combustion cylinders to receive second combustion gases from said second group of combustion cylinders;
   a first turbocharger having a first turbine and a first compressor, said first turbine having a first gas inlet port and a first gas outlet port, said first compressor having a first air inlet port and a first air outlet port, said first gas inlet port being connected in fluid communication with said first exhaust manifold, and said first air inlet port of said first compressor being in fluid communication with the atmosphere;
   a second turbocharger having a second turbine and a second compressor, said second turbine having a second gas inlet port and a second gas outlet port, said second compressor having a second air inlet port and a second air outlet port, said second gas inlet port being connected in fluid communication with said second exhaust manifold to receive at least a portion of said second combustion gases, said second gas outlet port being connected in fluid communication with said first gas inlet port of said first turbine, and said second air inlet port of said second compressor being in fluid communication with said first air outlet port of said first compressor;
   a mixer having a first input port, a second input port and an output port, said first input port being coupled to said second air outlet port to receive compressed air from said second turbocharger, and said output port being in fluid communication with said intake manifold; and
   a valve connected in fluid communication with said second exhaust manifold to receive a remainder of exhaust gases not included in said at least a portion of said second combustion gases received by said second turbine, said valve being connected in fluid communication with said second input port of said mixer to deliver at least a portion of said remainder of exhaust gases to said mixer for mixing with said compressed air in said mixer.

2. The internal combustion engine of claim 1, wherein at least one of said first turbocharger and said second turbocharger is a variable nozzle turbocharger.

3. The internal combustion engine of claim 1, wherein said first gas inlet port of said first turbocharger is formed by two separate gas input ports, a first gas input port of said two separate gas input ports is connected in fluid communication with said first exhaust manifold, and a second gas input port of said two separate gas input ports is connected in fluid communication with said second gas outlet port of said second turbocharger.

4. The internal combustion engine of claim 1, wherein said first turbocharger is a waste-gated turbocharger.

5. The internal combustion engine of claim 1, wherein said valve is a combination EGR valve and waste gate valve, said EGR valve having an EGR port connected in fluid communication with said mixer and said waste gate valve having a waste gate port connected in fluid communication with said first gas inlet port of said first turbocharger.

6. The internal combustion engine of claim 5, wherein said first gas inlet port of said first turbocharger is formed by two separate gas input ports, a first gas input port of said two separate gas input ports is connected in fluid communication with said first exhaust manifold, and a second gas input port of said two separate gas input ports is connected in fluid communication with both said second gas outlet port of said second turbocharger and said waste gate port.

7. The internal combustion engine of claim 1, wherein at least one of said first turbocharger and said second turbocharger is one of a variable nozzle turbocharger and a waste-gated turbocharger, said internal combustion engine including a nozzle controller coupled to said one of said variable nozzle turbocharger and said waste-gated turbocharger, and a valve controller coupled to said valve, to control a rate of EGR flow.

8. A work machine, comprising:
   a frame;
   a block connected to said frame, said block defining a plurality of combustion cylinders, said plurality of combustion cylinders having at least a first group of combustion cylinders and a second group of combustion cylinders;

an intake manifold connected to said block for providing combustion air to each of said plurality of combustion cylinders;

a first exhaust manifold connected to said first group of combustion cylinders to receive first combustion gases from said first group of combustion cylinders;

a second exhaust manifold connected to said second group of combustion cylinders to receive second combustion gases from said second group of combustion cylinders;

a first turbocharger having a first turbine and a first compressor, said first turbine having a first gas inlet port and a first gas outlet port, said first compressor having a first air inlet port and a first air outlet port, said first gas inlet port being connected in fluid communication with said first exhaust manifold, and said first air inlet port of said first compressor being in fluid communication with the atmosphere;

a second turbocharger having a second turbine and a second compressor, said second turbine having a second gas inlet port and a second gas outlet port, said second compressor having a second air inlet port and a second air outlet port, said second gas inlet port being connected in fluid communication with said second exhaust manifold to receive at least a portion of said second combustion gases, said second gas outlet port being connected in fluid communication with said first gas inlet port of said first turbine, and said second air inlet port of said second compressor being in fluid communication with said first air outlet port of said first compressor;

a mixer having a first input port, a second input port and an output port, said first input port being coupled to said second air outlet port to receive compressed air from said second turbocharger, and said output port being in fluid communication with said intake manifold; and a valve connected in fluid communication with said second exhaust manifold to receive a remainder of exhaust gases not included in said at least a portion of said second combustion gases received by said second turbine, said valve being connected in fluid communication with said second input port of said mixer to deliver at least a portion of said remainder of exhaust gases to said mixer for mixing with said compressed air in said mixer.

9. The work machine of claim 8, wherein at least one of said first turbocharger and said second turbocharger is a variable nozzle turbocharger.

10. The work machine of claim 8, wherein said first gas inlet port of said first turbocharger is formed by two separate gas input ports, a first gas input port of said two separate gas input ports is connected in fluid communication with said first exhaust manifold, and a second gas input port of said two separate gas input ports is connected in fluid communication with said second gas outlet port of said second turbocharger.

11. The work machine of claim 8, wherein said first turbocharger is a waste-gated turbocharger.

12. The work machine of claim 8, wherein said valve is a combination EGR valve and waste gate valve, said EGR valve having an EGR port connected in fluid communication with said mixer and said waste gate valve having a waste gate port connected in fluid communication with said first gas inlet port of said first turbocharger.

13. The work machine of claim 12, wherein said first gas inlet port of said first turbocharger is formed by two separate gas input ports, a first gas input port of said two separate gas input ports is connected in fluid communication with said first exhaust manifold, and a second gas input port of said two separate gas input ports is connected in fluid communication with both said second gas outlet port of said second turbocharger and said waste gate port.

14. The work machine of claim 8, wherein at least one of said first turbocharger and said second turbocharger is one of a variable nozzle turbocharger and a waste-gated turbocharger, said work machine including a nozzle controller coupled to said one of said variable nozzle turbocharger and said waste-gated turbocharger, and a valve controller coupled to said valve, to control a rate of EGR flow.

15. A method of providing engine emission control for an internal combustion engine, comprising the steps of:

providing a first turbocharger having a first turbine and a first compressor, said first turbine having a first gas inlet port and a first gas outlet port, said first compressor having a first air inlet port and a first air outlet port;

providing a second turbocharger having a second turbine and a second compressor, said second turbine having a second gas inlet port and a second gas outlet port, said second compressor having a second air inlet port and a second air outlet port;

supplying first combustion gases from a first group of combustion cylinders to a first exhaust manifold;

supplying second combustion gases from a second group of combustion cylinders to a second exhaust manifold;

supplying said first combustion gases from said first exhaust manifold to said first gas inlet port of said first turbine;

supplying at least a portion of said second combustion gases from said second manifold to said second gas inlet port of said second turbine;

supplying exhaust gases expelled from said second gas outlet port of said second turbine to said first gas inlet port of said first turbine;

supplying fresh air to said first air inlet port of said first compressor from the atmosphere;

compressing said fresh air by said first compressor to form first stage compressed air;

supplying said first stage compressed air from said first compressor to said second air inlet port of said second compressor;

compressing said first stage compressed air with said second compressor to form second stage compressed air;

supplying said second stage compressed air to a mixer;

supplying to said mixer at least a portion of a reminder of exhaust gases not included in said at least a portion of said second combustion gases supplied to said second turbine, for mixing with said second stage compressed air to form a mixture; and supplying said mixture to said first group of combustion cylinders and said second group of combustion cylinders.

16. The method of claim 15, including the step of varying a nozzle opening in at least one of said first turbocharger and said second turbocharger.

17. The method of claim 15, wherein said first gas inlet port of said first turbocharger is formed by two separate gas input ports, said method including the steps of:

supplying said first combustion gases from said first exhaust manifold to a first gas input port of said first turbine; and supplying at least exhaust gases from said second gas outlet port of said second turbocharger to a second gas input port of said first turbine.

18. The method of claim 15, including the step of controlling a waste gate of said first turbocharger.

19. The method of claim 15, including the steps of:
dividing said remainder of said exhaust gases into a first portion and a second portion;
supplying said first portion of said remainder of said exhaust gases to said mixer; and
supplying said second portion of said remainder of said exhaust gases to said first gas inlet port of said first turbocharger.

20. The method of claim 19, wherein said first gas inlet port of said first turbocharger is formed by two separate gas input ports, said method comprising the steps of:
supplying said first combustion gases from said first exhaust manifold to a first gas input port of said first turbine;
supplying exhaust gases from said second gas outlet port of said second turbocharger to a second gas input port of said first turbine; and
supplying said second portion of said remainder of said exhaust gases to said second gas input port of said first turbine.

* * * * *